US012650326B2

(12) United States Patent
Hahn et al.

(10) Patent No.: US 12,650,326 B2
(45) Date of Patent: Jun. 9, 2026

(54) METHOD FOR DOSING A LIQUID PORTION AND DOSING DEVICE

(71) Applicant: Festo SE & Co. KG, Esslingen (DE)

(72) Inventors: Thomas Hahn, Sudbury, MA (US);
Sidhaant Gupta, Waltham, MA (US);
Arun Madhusudhanan, Roxbury, MA (US); Martin Bochterle, Fellbach (DE)

(73) Assignee: Festo SE & Co. KG, Esslingen (DE)

( * ) Notice: Subject to any disclaimer, the term of this patent is extended or adjusted under 35 U.S.C. 154(b) by 155 days.

(21) Appl. No.: 18/792,763

(22) Filed: Aug. 2, 2024

(65) Prior Publication Data

US 2026/0036457 A1     Feb. 5, 2026

(51) Int. Cl.
G01F 13/00      (2006.01)
G01F 15/00      (2006.01)

(52) U.S. Cl.
CPC ............ G01F 13/00 (2013.01); G01F 15/005 (2013.01)

(58) Field of Classification Search
CPC ........ G01F 13/00; G01F 15/005; G01F 15/06; G01F 15/063; G01F 11/30; G01F 11/32; B67D 7/06; B67D 7/08
USPC ................................................ 222/1, 71–72
See application file for complete search history.

(56) References Cited

U.S. PATENT DOCUMENTS

| | | | | |
|---|---|---|---|---|
| 4,023,709 A | * | 5/1977 | Becker | G01N 35/1097 |
| | | | | 222/638 |
| 2012/0024888 A1 | * | 2/2012 | Shvets | G01N 35/1004 |
| | | | | 222/1 |
| 2020/0340843 A1 | * | 10/2020 | Bochterle | G01F 11/28 |

FOREIGN PATENT DOCUMENTS

DE     10 2019 134 804 A1     6/2021

* cited by examiner

*Primary Examiner* — David J Walczak
(74) *Attorney, Agent, or Firm* — HSML P.C.

(57) ABSTRACT

Method for dosing a liquid portion using a dosing apparatus including the steps of pressurizing the liquid reservoir with compressed air by a compressed air source so that the liquid is moved by pressurization in the first channel section and the second channel section, moving the valve member from the closed position to the open position at the beginning of a dosing time, such that the liquid is moved into the third channel section and the fourth channel section and dosed from the dosing tip, moving the valve member from the open position to the closed position at the end of the dosing time, determining an outlet pressure course during the dosing time and/or after the dosing time with the outlet pressure sensor and/or determining an inlet pressure course during the dosing time and/or after the dosing time with the inlet pressure sensor.

13 Claims, 4 Drawing Sheets

130

134

131

132

200

210

220

230

240

250

METHOD FOR DOSING A LIQUID PORTION AND DOSING DEVICE

The invention relates to a method for dosing a liquid portion and a dosing apparatus.

DE 10 2019 134 804 A1 discloses a measuring arrangement for detecting fluid properties, comprising a micromechanical sensor, an annular channel which has at least a first throttle element, a second throttle element and a third throttle element, a first and a second fluid line which open into the annular channel between the first and the second throttle element and between the third and the first throttle element, three pressure sensors for detecting pressure measurements between two adjacent throttle elements, a measuring and operating circuit which is set up to determine the at least one property of the fluid based on the measured values of the micromechanical sensor and to detect a fluid flow between the second and third throttle elements based on pressure measurements, wherein the micromechanical sensor is arranged in the annular channel between the first and the second fluid line in series with at least one throttle element other than the first throttle element.

SUMMARY

The object underlying the invention is to enable a reliable dosing of a liquid.

The object is solved with a method described hereinafter:

A method for dosing a liquid portion according to the invention is carried out using a dosing apparatus, the dosing apparatus having a fluid channel comprising a first channel section, a second channel section, a third channel section and a fourth channel section, wherein the first channel section is fluidly connected to the second channel section, the second channel section is fluidly connected to the third channel section and the third channel section is fluidly connected to the fourth channel section, and with a valve in which the second channel section and the third channel section are arranged and which valve has a valve member which is arranged be-tween the second channel section and the third channel section and which valve member can be moved into an open position in which the fluidic connection of the second channel section to the third channel section is enabled, and which valve member can be moved into a closed position, in which the fluidic connection of the second channel section to the third channel section is closed, the dosing apparatus having a liquid reservoir, in which a liquid is accommodated, which liquid reservoir is fluidically connected to the first channel section, the dosing apparatus having a dosing tip, which dosing tip is fluidically connected to the fourth channel section and acts as a throttle, the dosing apparatus having a compressed air source, by means of which compressed air source compressed air can be applied to the liquid reservoir, the dosing apparatus having an outlet pressure sensor, which outlet pressure sensor is associated with the fourth channel section, and/or the dosing apparatus having an inlet pressure sensor, which inlet pressure sensor is associated with the first channel section, the dosing apparatus having a processor.

The method according to the invention is carried out with the steps pressurizing the liquid reservoir with compressed air by means of the compressed air source so that the liquid is moved by pressurization in the first channel section and the second channel section, moving the valve member from the closed position to the open position at the beginning of a dosing time, such that the liquid is moved into the third channel section and the fourth channel section and dosed from the dosing tip, moving the valve member from the open position to the closed position at the end of the dosing time, determining an outlet pressure course during the dosing time and/or after the dosing time with the outlet pressure sensor and/or determining an inlet pressure course during the dosing time and/or after the dosing time with the inlet pressure sensor, wherein the processor processes the out-let pressure course and/or the inlet pressure course together with a viscosity parameter of the liquid and together with a geometry parameter of the dosing tip in order to determine a volume of the liquid dosed from the dosing tip during the dosing time.

The liquid is moved in the fluid channel. The numbering of the channel sections corresponds to the direction of movement of the liquid within the fluid channel during the dosing process. Accordingly, the liquid enters the fluid channel via the first channel section and flows from there into the second channel section, the third channel section and the fourth channel section before flowing out of the dosing apparatus via the dosing tip. The flowing of the liquid out of the dosing tip is referred to as dosing the liquid from the dosing tip.

The movement of the liquid in the fluid channel is initiated by compressed air, which is pressed into the liquid reservoir. This results in an overpressure in the liquid reservoir compared to the environment surrounding the dosing apparatus, which is reduced in the direction of the dosing tip. In one operating state, the liquid reservoir only has a first opening, through which compressed air is fed, and a second opening, through which the first channel section protrudes from the liquid reservoir. On the side of the first channel section facing away from the second channel section, the first channel section is immersed in the liquid. Thus, on the one hand, compressed air can be prevented from entering the fluid channel and, on the other hand, it can be ensured that the liquid flows into the fluid channel if there is excess pressure in the liquid reservoir.

In the context of the present invention, the fluid channel is subdivided into channel sections in order to be able to clearly designate and assign the different functions or areas of the fluid channel. Preferably, the first and/or the fourth channel section are tubular and further preferably connected to the valve by means of a hose coupling. Preferably, the second and third channel sections are configured as part of the valve and are also preferably bounded by housing components of the valve.

Preferably, the valve is configured as a solenoid valve, so that the movement of the valve member is caused by energizing an electromagnet. The movement of the valve member can optionally release or block a valve seat formed between the second channel section and the third channel section.

If the valve member is in the closed position, the valve member closes off the fluid channel in a fluid-tight manner so that the liquid is prevented from passing from the second channel section to the third channel section. This also prevents liquid coming from the liquid reservoir from flowing out of the dosing tip.

Preferably, the valve is configured in the form of a media-separated diaphragm valve. Alternatively, the valve can be configured in the form of a piston slide valve or in the form of a poppet valve.

In particular, liquids used in the field of biotechnology, such as substrate solutions, active ingredient solutions, sample liquids or similar liquids, can be used as liquids.

These are usually aqueous, i.e., low-viscosity, in particular water-based or organic, for example alcohol-based, liquids or liquid mixtures.

The dosing tip has a known internal geometry that is in contact with the liquid. The geometry characteristic value of the dosing tip is determined on the basis of the dimensions of the internal geometry of the dosing tip. Preferably, the internal geometric dimensions of the dosing tip are known within a certain tolerance range, so that the geometric characteristic value of the dosing tip can be determined without having to measure the internal geometry of the dosing tip separately beforehand. Preferably, the internal geometry of the dosing tip is configured to be rotationally symmetrical, possibly circular-cylindrical in section and tapered towards a dosing opening. Furthermore, the radius and/or the length of the cavity of the dispensing tip is preferably taken into account when determining the geometric characteristic of the dispensing tip. Particularly preferably, the geometry parameter G of the dosing tip is obtained as a quotient, from a divisor and a dividend, wherein the dividend is the fourth power of the radius of the cavity of the dosing tip and wherein the divisor is the length of the cavity of the dosing tip.

In general, all components of the dosing apparatus through which the liquid is moved act as a throttle due to friction and/or changes in cross-section. In addition to the dosing tip, the fluid channel is also of particular importance here. However, the dosing tip, which typically converges towards the dosing opening, preferably creates at least twice as much resistance to the movement of the liquid as the other components of the dosing apparatus. The dosing tip is thus deliberately used as a throttle, while the throttling effect of the other components is to be accepted by nature. The throttling effect of the dosing tip can be influenced by its internal geometry. For example, by increasing the length of the cavity of the dosing tip and/or reducing the radius of the cavity of the dosing tip, the resistance offered to the liquid can be increased, thus increasing the throttling effect. In addition, by reducing the length of the cavity of the dosing tip and/or by increasing the radius of the cavity of the dosing tip, for example, the resistance opposed to the liquid can be reduced and thus the throttling effect can be reduced.

Preferably, the outlet pressure sensor is configured as a relative pressure sensor. This means that the outlet pressure is measured directly as relative pressure to the atmosphere, i.e., as relative outlet pressure. Furthermore, the outlet pressure sensor is preferably configured as a piezoresistive pressure sensor. Alternatively, the outlet pressure sensor is configured as a piezoelectric or capacitive pressure sensor.

Preferably, the compressed air source is configured as a decentralized compressed air generator so that the compressed air source can be directly associated with the liquid reservoir. The compressed air source comprises a compressor, a power supply and, in particular, a proportional pressure control.

Preferably, a pressure control valve, in particular a proportional pressure control valve, is arranged between the compressed air source and the liquid reservoir, with which the pressure applied to the liquid reservoir can be controlled. Preferably, the pressure control valve is positioned directly upstream of the liquid reservoir, particularly preferably in the liquid reservoir. This allows the pressure of the compressible compressed air to be controlled in the immediate vicinity of the location at which the compressed air is used to move the liquid into the first and second channel sections. This allows rapid, i.e., high-frequency, control of the pressure of the compressed air used to move the liquid into the first and second channel sections. As a result, a defined movement of the liquid in the fluid channel and a defined outflow of the liquid from the dosing tip is enabled. In particular, this enables a droplet break-off of the liquid at the dosing tip in the desired manner towards the end of the dosing process.

The processor is set up to carry out the method according to the invention. For this purpose, the processor preferably has at least one electrical circuit, in particular a microprocessor or microcontroller, on which a computer program code for executing the method according to the invention is stored and/or with which the computer program code for executing the method according to the invention can be executed. Further preferably, the processor is set up to record the outlet pressure course recorded by the outlet pressure sensor during the dosing time and, in particular, to store it in the processor. Particularly preferably, the processor is configured to determine the viscosity parameter and/or the viscosity parameter is stored in the processor. It is also preferred that the geometry characteristic value of the dosing tip is stored in the processor.

The method according to the invention is intended, for example, for use in environments with a high degree of automation. In that, according to the invention, the outlet pressure course, the viscosity parameter and the geometry parameter of the dosing tip are used to determine the volume of the liquid dosed from the dosing tip during the dosing time, no further measuring means, in particular scales or measuring cylinders, are required to determine the volume.

The dosing time is defined as a time difference or a time interval between the time at the beginning of dosing and the time at the end of dosing. The time at the beginning of dosing is the time at which a fluidic connection exists between the second channel section and the third channel section after the movement of the valve member from the closed position to the open position has been initiated. When using a valve configured as a diaphragm valve, for example, this is the time at which the diaphragm lifts off a valve seat due to the movement of the valve member. The time at the end of dosing is the time at which the fluidic connection between the second channel section and the third channel section is interrupted after the movement of the valve member from the open position to the closed position has been initiated. When using a valve configured as a diaphragm valve, for example, this is the point in time at which the diaphragm is again in sealing contact with the valve seat.

Preferably, the volume of the liquid dosed from the dosing tip during the dosing time is determined taking into account the integral of the outlet pressure over time. Further preferably, the volume of the liquid V dosed from the dosing tip during the dosing time is determined according to the following formula, in which $p_{outlet}$ is the relative outlet pressure, i.e. the absolute outlet pressure minus the ambient pressure, $P_{viscosity}$ is the viscosity parameter, $t_0$ is the time at the beginning of dosing, $t_{end}$ is the time at the end of dosing, and G is the geometry parameter:

$$V = \int_{t_0}^{t_{end}} \frac{\pi \cdot p_{outlet}}{P_{viscosity}} \cdot G dt$$

Preferably, the viscosity parameter relates to the dynamic viscosity or the kinematic viscosity of the liquid. The dynamic viscosity of the liquid is the product of the kinematic viscosity of the liquid and its density. Further preferably, the viscosity parameter is proportional to the dynamic viscosity or the kinematic viscosity of the liquid. Preferably, the viscosity parameter is specific for a liquid type and/or liquid class of the liquid or conclusions can be drawn about the liquid type and/or liquid class. By using the viscosity parameter, it is possible to determine the volume of the liquid dosed from the dosing tip during the dosing time without taking into account or using the type and/or class of liquid. Particularly preferably, the viscosity parameter P is calculated as eight times the dynamic viscosity according to the following formula, in which η is the dynamic viscosity:

$$P_{viscosity} = 8 \cdot \eta$$

Further features further developing the invention are subject of the dependent claims with the features described hereinafter:

Preferably, immediately after the valve member has been moved from the closed position to the open position or immediately after the valve member has been moved from the open position to the closed position, the outlet pressure sensor is used to determine an outlet pressure oscillation course, wherein the viscosity parameter is determined on the basis of the outlet pressure oscillation course.

The movement of the valve member influences the movement of the liquid in the fluid channel. After moving the valve member from the closed position to the open position, there is an abrupt increase in pressure in the fourth channel section, which causes a pressure wave in the fourth channel section. If this pressure wave encounters an obstacle, in particular the dosing tip which acts as a throttle, the pressure wave is at least partially reflected by the obstacle, resulting in a pressure oscillation. The time course of this pressure oscillation in relation to the outlet pressure is referred to as the outlet pressure oscillation course. The outlet pressure oscillation course is determined by the outlet pressure sensor and is preferably a time-related part of the outlet pressure course, which is determined in particular immediately after the valve member has moved from the open position to the closed position, i.e. at the beginning of the dosing time, or immediately after the valve member has moved from the open position to the closed position, i.e. at the end of the dosing time.

Similarly, a pressure oscillation occurs when the valve member is moved from the open position to the closed position. This leads to an abrupt drop in pressure. In the area of the third channel section facing the second channel section, a lower pressure then occurs, at least temporarily, than in the remaining area of the third channel section and in the fourth channel section. This pressure difference leads to a pressure equalization, which is directed against the direction of movement of the liquid which occurs during dosing.

Accordingly, the outlet pressure oscillation course can be determined both after the valve member has been moved from the closed position to the open position and after the valve member has been moved from the open position to the closed position.

The outlet pressure oscillation course depends on the dynamic and/or kinematic viscosity of the liquid and thus on its viscosity parameter. The kinematic viscosity is a measure of how the liquid flows under the influence of gravity. The dynamic viscosity is a measure of the resistance of the liquid to deformation. As the pressure oscillation course as described above results from influencing the movement of the liquid, a liquid with a high dynamic viscosity causes greater resistance to the influence of movement than a liquid with a low dynamic viscosity. This means that the pressure course of a liquid with a high dynamic viscosity is less strongly influenced than the pressure course of a liquid with a low dynamic viscosity. On the one hand, this is expressed in the fact that lower pressure amplitudes are achieved with a liquid with a high dynamic viscosity than with a liquid with a low dynamic viscosity. On the other hand, the frequency of the pressure amplitudes is greater for a liquid with a high dynamic viscosity than for a liquid with a low dynamic viscosity. This also means that the decay rate of the amplitudes of successive pressure extrema is greater for a liquid with a high dynamic viscosity, i.e., the pressure oscillation is damped more than for a liquid with a low dynamic viscosity.

In addition or alternatively, immediately after the valve member has been moved from the closed position to the open position or immediately after the valve member has been moved from the open position to the closed position, the inlet pressure sensor is used to determine an inlet pressure oscillation course, wherein the viscosity parameter is determined on the basis of the inlet pressure oscillation course. Furthermore, it is possible to determine a further inlet pressure oscillation course immediately after the movement of the valve member from the open position to the closed position. The above description of the outlet pressure oscillation course, in particular in connection with the dynamic and/or kinematic viscosity, applies analogously to the inlet pressure oscillation course. The inlet pressure oscillation course is determined with the inlet pressure sensor and is preferably a time-related part of the inlet pressure course, which is located in particular immediately after the valve member has moved from the closed position to the open position, i.e. at the beginning of the dosing time, or immediately after the valve member has moved from the open position to the closed position, i.e. at the end of the dosing time.

With respect to the inlet pressure, this results in an abrupt increase in pressure in the second channel section when the valve member is moved from the open position to the closed position and an abrupt drop in pressure when the valve member is moved from the closed position to the open position.

The viscosity parameter can be determined on the basis of the outlet pressure oscillation course and/or on the basis of the inlet pressure oscillation course. If the viscosity parameter is determined on the basis of the outlet pressure oscillation course and the inlet pressure oscillation course, these two pressure oscillation courses are included in parallel in the determination of the viscosity parameter.

Preferably, the viscosity parameter is determined using at least one parameter, which parameter is determined using the outlet pressure oscillation course, which parameter is of the group: amplitude of a first extremum, amplitude of a second extremum, amplitude of a third extremum, time difference between a first extremum and/or the second extremum and/or the third extremum, decay rate of the amplitude of at least two successive extrema. Considering the mechanisms described above, conclusions about the dynamic and kinematic viscosity can be drawn from the aforementioned amplitude-related parameters.

The numbering of the amplitude-related extrema follows the temporal occurrence of the extrema in question, i.e. the first extremum occurs first, followed by the second extremum.

The third extremum then occurs. It is possible to use the amplitudes of further extrema as parameters for determining the viscosity parameter, for example the amplitude of the fourth, fifth, sixth, seventh, eighth, ninth and/or tenth extremum. The extrema can each be a maximum or a minimum.

The time intervals between the extrema can include the time interval between the first and the second extremum, the time interval between the first and the third extremum and the time interval between the second and the third extremum. If further extrema are determined or taken into account, further time intervals can be taken into account iteratively, for example the time interval between the first and the fourth extremum, the time interval between the second and the fourth extremum and the time interval between the third and the fourth extremum and so on.

The decay rate of the amplitude of at least two consecutive extrema is a measure of how quickly the amplitude values of consecutive extrema decrease. With a high decay rate, the amplitude values decrease more strongly or faster than with a low decay rate.

Alternatively or in addition the viscosity parameter is determined using at least one parameter, which parameter is determined using the inlet pressure oscillation course, which parameter is of the group: amplitude of a first extremum, amplitude of a second extremum, amplitude of a third extremum, time difference between a first extremum and/or the second extremum and/or the third extremum, decay rate of the amplitude of at least two successive extrema.

Preferably, the viscosity parameter is determined using at least one parameter, which parameter is determined using the outlet pressure oscillation course and inlet pressure oscillation course, which parameter is of the group: amplitude of a first extremum, amplitude of a second extremum, amplitude of a third extremum, time difference between a first extremum and/or the second extremum and/or the third extremum, decay rate of the amplitude of at least two successive extrema.

Preferably, before the volume of the liquid is determined, the processor is parameterized by using the inlet pressure sensor to determine a maximum feed pressure provided by the compressed air source while the valve member is in the closed position, the following steps also being carried out for at least one test liquid with known dynamic viscosity: moving the test liquid in the fluid channel by moving the valve member from the closed position to the open position and subsequently moving the valve member from the open position to the closed position, wherein immediately after the valve member has been moved from the closed position to the open position or immediately after the valve member has been moved from the open position to the closed position, the outlet pressure sensor is used to determine an outlet pressure oscillation course of the at least one test liquid, wherein the viscosity parameter of the at least one test liquid is determined on the basis of the outlet pressure oscillation course of the at least one test liquid, wherein the viscosity parameter of the at least one test liquid is determined using at least one parameter, which parameter is determined using the outlet pressure oscillation course of the at least one test liquid, which parameter is of the group: amplitude of a first extremum, amplitude of a second extremum, amplitude of a third extremum, time difference between a first extremum and/or the second extremum and/or the third extremum, decay rate of the amplitude of at least two successive extrema, wherein subsequently at least one viscosity class is determined taking into account the determined viscosity parameter of the at least one test liquid and the supply pressure, wherein, in the subsequent determination of the volume, the at least one viscosity class is associated with the liquid if there is a corresponding match, this associated at least one viscosity class being used to determine the volume of the liquid dosed from the dosing tip during the dosing time.

In that the viscosity parameter of the at least one test liquid is determined and a viscosity class is determined on this basis, the direct determination of the viscosity parameter of the liquid dosed from the dosing tip during the dosing time, for example on the basis of the inlet pressure oscillation course and/or the outlet pressure oscillation course, can be avoided. Rather, the associated viscosity class required for determining the volume of the liquid dosed from the dosing tip in accordance with the above preferred embodiment of the invention is used. Once this associated viscosity class has been determined and stored in the processor, for example, it can replace the viscosity parameter of the liquid dosed from the dosing tip or be used as the corresponding viscosity parameter in relation to subsequent dosing processes. If reference is made to the viscosity parameter of the liquid dosed from the dosing tip, an associated viscosity class can thus be meant, but also a viscosity parameter determined, for example, on the basis of the inlet pressure oscillation course and/or the outlet pressure oscillation course without prior knowledge of viscosity classes.

In addition or alternatively, before the volume of the liquid is determined, the processor is parameterized by using the inlet pressure sensor to determine a maximum feed pressure provided by the compressed air source while the valve member is in the closed position, the following steps also being carried out for at least one test liquid with known dynamic viscosity: moving the test liquid in the fluid channel by moving the valve member from the closed position to the open position and subsequently moving the valve member from the open position to the closed position, wherein immediately after the valve member has been moved from the closed position to the open position or immediately after the valve member has been moved from the open position to the closed position, the inlet pressure sensor is used to determine an inlet pressure oscillation course of the at least one test liquid, wherein the viscosity parameter of the at least one test liquid is determined on the basis of the inlet pressure oscillation course of the at least one test liquid, wherein the viscosity parameter is determined using at least one parameter, which parameter is determined using the inlet pressure oscillation course of the at least one test liquid, which parameter is of the group: amplitude of a first extremum, amplitude of a second extremum, amplitude of a third extremum, time difference between a first extremum and/or the second extremum and/or the third extremum, decay rate of the amplitude of at least two successive extrema, wherein subsequently at least one viscosity class is determined taking into account the determined viscosity parameter of the at least one test liquid and the supply pressure, wherein, in the subsequent determination of the volume, the at least one viscosity class is associated with the liquid if there is a corresponding match, this associated at least one viscosity class being used to determine the volume of the liquid dosed from the dosing tip during the dosing time.

Preferably, the association of a viscosity class with the liquid dosed from the dosing tip is less complex than the determination of a relevant viscosity parameter without prior knowledge of viscosity classes. In particular, the association with a viscosity class is made on the basis of fewer amplitude-related parameters, if necessary on the basis of only one amplitude-related parameter, while the viscosity parameter of the test liquid in question is determined on the basis of more amplitude-related parameters.

If the inlet pressure oscillation course is determined after the valve member has been moved from the open position to the closed position, the time between the movement of the valve member from the closed position to the open position and the movement of the valve member from the open position to the closed position can be minimized. Alternatively or in addition, a test dosing time can be used as the time between the movement of the valve member from the closed position to the open position and the movement of the valve member from the open position.

Preferably, the processor is parameterized with a plurality of test liquids each having known, different dynamic viscosities, a plurality of viscosity classes being determined taking into account the viscosity parameter determined for each of the plurality of test liquids. Thus, the accuracy of the volume determination for the liquid dosed from the dosing tip can be increased. Further preferably, a viscosity parameter is determined several times for a test liquid, wherein the corresponding viscosity class is determined on the basis of the several viscosity parameters of a test liquid.

Preferably, the different viscosity classes are determined using a viscosity parameter-based machine learning model. The viscosity parameter-based model for machine learning is a model in which at least one statistical learning algorithm is stored and which can be used to determine functional relationships between at least one viscosity parameter as an input variable and possibly other input variables and at least one viscosity class as an output variable. Thus, there is no need to acquire complex knowledge of physical relationships regarding the liquid and the dosing apparatus, which in particular simplifies the parameterization of the processor.

Preferably, a test volume is determined for at least one test liquid, wherein a comparison volume is determined for the at least one test liquid, wherein a volume-based model for machine learning is trained taking into account the test volume and the comparison volume. The volume-based model for machine learning is a model in which at least one statistical learning algorithm is stored and with which functional relationships between the determined test volume as input variable and, if applicable, other input variables and the comparison volume as output variable can be determined. The test volume is determined via the above method, whereat the comparison volume is determined via classic volumetric determination, e.g., by measuring with a measuring cylinder.

Preferably, the volume-based machine learning model is trained after the at least one viscosity class has been determined. Further preferably, the reference volume is determined using a direct measurement method, for example using a measuring cylinder. Particularly preferably, after the volume-based model for machine learning has been trained, the volume of the liquid dosed from the dosing tip is determined taking into account the trained volume-based model for machine learning.

Preferably, a test volume and a comparison volume each are determined for a plurality of test liquids, the volume-based model for machine learning being trained taking into account the test volumes and the comparison volumes. Thus, any measurement errors that occur when determining the comparison volume or when measuring with the outlet pressure sensor can be compensated for, thereby increasing the accuracy of the volume determination for the liquid dosed from the dosing tip.

Preferably, the viscosity-based machine learning model and/or the volume-based machine learning model is based on a multi-layer machine learning model, a so-called deep learning model. The multi-layer machine learning model uses several intermediate layers between an input layer and an output layer. Artificial neural networks are configured between the layers.

Preferably, the viscosity parameter-based model for machine learning and/or the volume-based model for machine learning is trained with at least one test liquid for which a viscosity parameter and a density are known. Further preferably, the viscosity parameter-based model for machine learning and/or the volume-based model for machine learning is trained with several test liquids, for each of which a viscosity parameter and a density are known, wherein in particular the viscosity parameters and/or the densities of the test liquids differ from one another. Preferably, at least one of the following characteristics is used in the training: Amplitude of the first extremum, amplitude of the second extremum, amplitude of the third extremum, time difference between the first extremum and/or the second extremum and/or the third extremum, decay rate of the amplitude of at least two consecutive extrema. The characteristics can be determined on the basis of the outlet pressure oscillation course and/or on the basis of the inlet pressure oscillation course.

It is particularly preferable to use several of the features during training. Thus, more accurate results can be achieved in the so-called inferencing.

Preferably, the viscosity parameter and the volume of the liquid dosed from the dosing tip are used to determine a mass of the liquid dosed from the dosing tip.

Preferably, the viscosity parameter and the volume of the liquid dosed from the dosing tip are used to determine a mass of the liquid dosed from the dosing tip. Further preferably, the viscosity parameter is used to determine a density parameter of the liquid, on the basis of which the mass of the liquid dosed from the dosing tip is determined. In particular, the mass of the liquid m dosed from the dosing tip is determined according to the following formula, in which e is the density parameter:

$$m = \varrho \cdot V$$

The object underlying the present invention is moreover solved with a dosing apparatus with the features described hereinafter: The dosing apparatus having a fluid channel comprising a first channel section, a second channel section, a third channel section and a fourth channel section, wherein the first channel section is fluidly connected to the second channel section, the second channel section is fluidly connected to the third channel section and the third channel section is fluidly connected to the fourth channel section, and with a valve in which the second channel section and the third channel section are arranged and which valve has a valve member which is arranged between the second channel section and the third channel section and which valve member can be moved into an open position in which the fluidic connection of the second channel section to the third channel section is enabled, and which valve member can be moved into a closed position, in which the fluidic connection of the second channel section to the third channel section is closed, the dosing apparatus having a liquid reservoir, in which a liquid is accommodated, which liquid reservoir is fluidically connected to the first channel section, the dosing apparatus having a dosing tip, which dosing tip is fluidically connected to the fourth channel section and acts as a throttle, the dosing apparatus having a compressed air source, by means of which compressed air source compressed air can be applied to the liquid reservoir, the dosing apparatus having an outlet pressure sensor, which outlet pressure sensor is associated with the fourth channel section, and/or the dosing apparatus having an inlet pressure sensor, which inlet pressure sensor is associated with the first channel section, the dosing apparatus having a processor, which processer being configured to carry out a method comprising the steps of pressurizing the liquid reservoir with compressed air by means of the compressed air source so that the liquid is moved by pressurization in the first channel section and the second channel section, moving the valve member from the closed position to the open position at the beginning of a dosing time, such that the liquid is moved into the third channel section and the fourth channel section and dosed from the dosing tip, moving the valve member from the open position to the closed position at the end of the dosing time, determining an outlet pressure course during the dosing time and/or after the dosing time with the outlet pressure sensor and/or determining an inlet pressure course during the dosing time and/or after the dosing time with the inlet pressure sensor, wherein the processor processes the outlet pressure course and/or the inlet pressure course together with a viscosity parameter of the liquid and together with a geometry parameter of the dosing tip in order to determine a volume of the liquid dosed from the dosing tip during the dosing time.

BRIEF DESCRIPTION OF THE DRAWINGS

In the following, the invention is explained in more detail with reference to the enclosed drawing in which it is shown.

DETAILED DESCRIPTION

Figure 1:
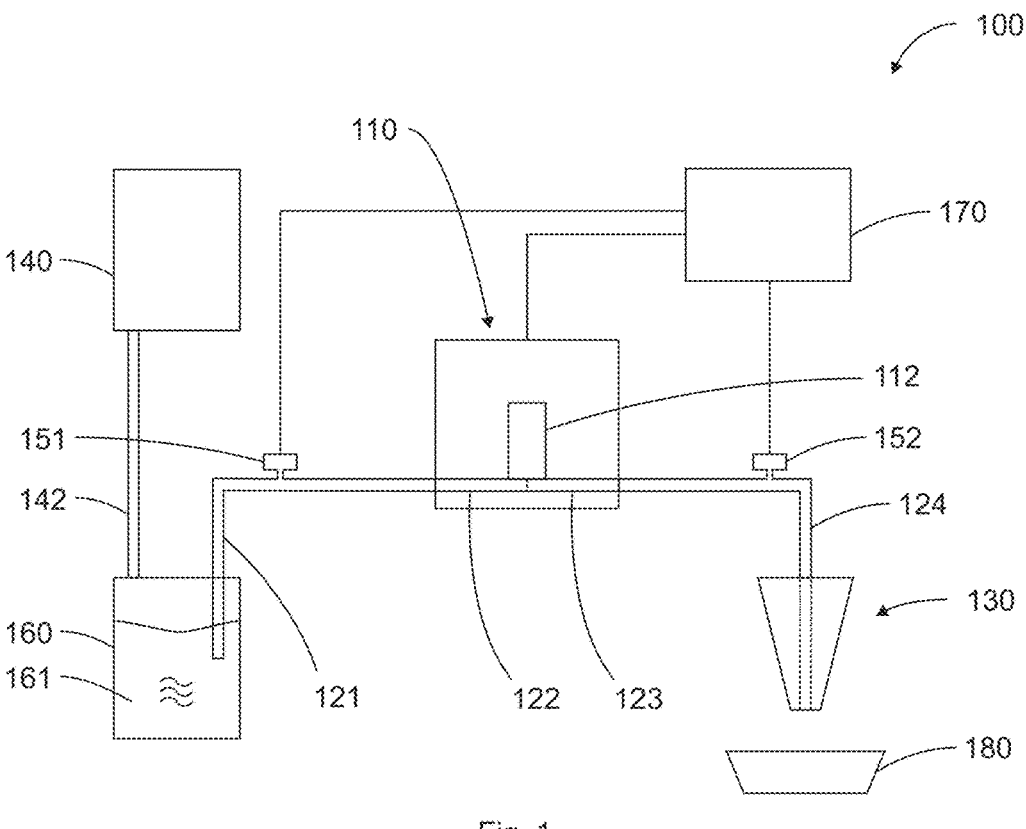
FIG. 1 a dosing apparatus with a valve member in an open position.

FIG. 1 shows a dosing apparatus 100 with a valve member 112 in an open position. The dosing apparatus 100 has a fluid channel which comprises a first channel section 121, a second channel section 122, a third channel section 123 and a fourth channel section 124. The first channel section 121 is fluidly connected to the second channel section 122. The second channel section 122 is fluidly connected to the third channel section 123. The third channel section 123 is fluidically connected to the fourth channel section 124.

The dosing apparatus 100 has a valve 110 in which the second channel section 122 and the third channel section 123 are arranged. The valve 110 has a valve member 112, which is arranged between the second channel section 122 and the third channel section 123. The valve member 112 is movable into an open position, in which the fluidic connection of the second channel section 122 to the third channel section 123 is enabled (see FIG. 1). The valve member 112 can also be moved from the open position to a closed position, in which the fluidic connection of the second channel section 122 to the third channel section 123 is closed (see FIG. 2).

The dosing apparatus 100 comprises a liquid reservoir 160 in which a liquid 161 is accommodated. The liquid reservoir 160 is fluidically connected to the first channel section 121, in that the first channel section 121 is immersed in the liquid 161. The dosing apparatus 100 has a dosing tip 130, which is fluidically connected to the fourth channel section 124 and acts as a throttle.

The dosing apparatus 100 has a compressed air source 140, by means of which the liquid reservoir 160 can be supplied with compressed air. For this purpose, the compressed air source 140 is connected to the liquid reservoir 160 by means of a compressed air channel 142.

The dosing apparatus 100 further comprises an outlet pressure sensor 152 associated with the fourth channel section 124. In addition, the dosing apparatus 100 has an inlet pressure sensor 151 associated with the second channel section 122.

The dosing apparatus 100 comprises a processor 170, which is electrically connected to the inlet pressure sensor 151, the outlet pressure sensor 152 and the valve 110, respectively.

A sample container 180 is arranged below the dosing tip 130, into which the liquid 161 dosed from the dosing tip 130 can be received.

Figure 2:
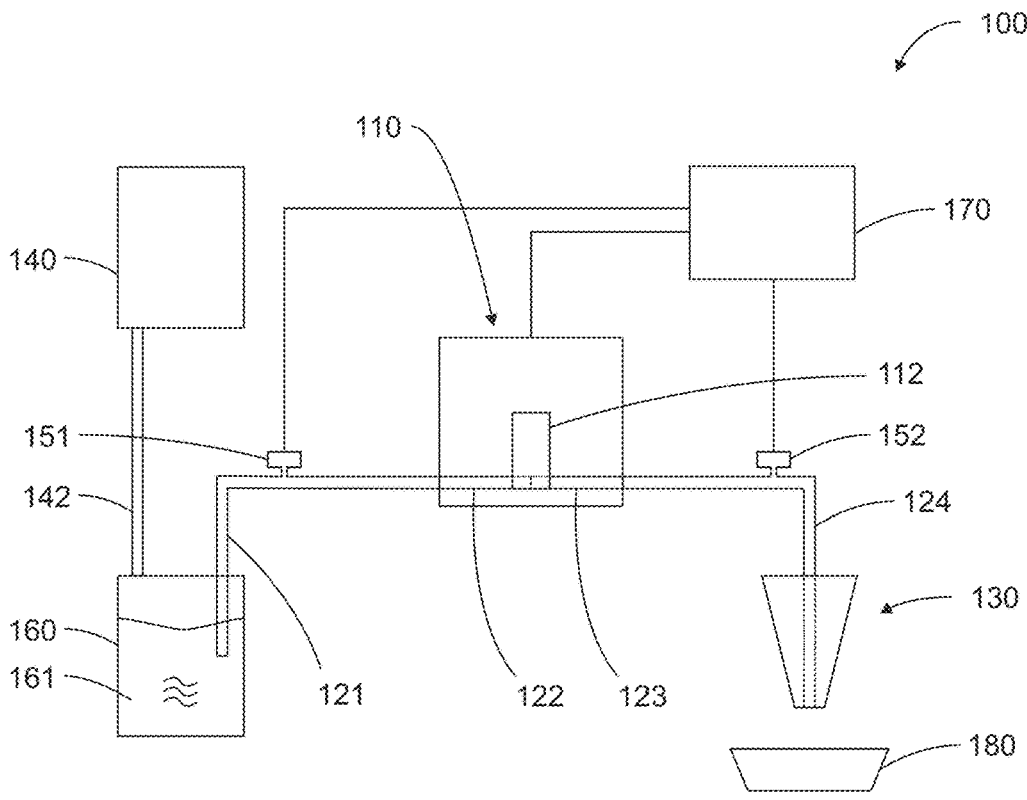
FIG. 2 the dosing apparatus shown in FIG. 1 with the valve member in a closed position, FIG. 3 a dosing tip of the dosing apparatus shown in FIGS. 1 and 2, FIG. 4 a method for dosing a liquid portion, FIG. 5 an outlet pressure curve with a short dosing time, FIG. 6 an outlet pressure curve with a large dosing time, FIG. 7 an inlet pressure curve of a lightly influenced inlet pressure, and FIG. 8 an inlet pressure curve of a strongly influenced inlet pressure.
Figure 3:
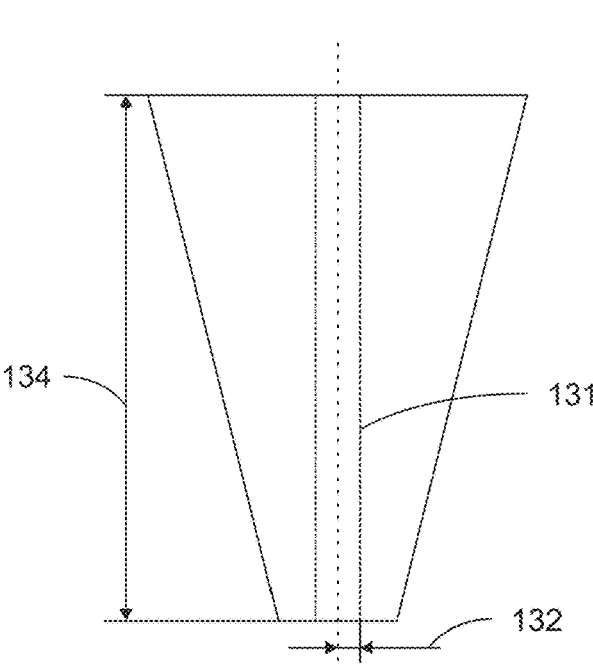

FIG. 3 shows the dosing tip 130 of the dosing apparatus 100 shown in FIGS. 1 and 2. The dosing tip 130 has an internal geometry 131 which is in contact with the liquid 161. By way of example only, the internal geometry 131 is configured to be circular-cylindrical and has a length 134 and a radius 132. By way of example only, the outer geometry of the dosing tip 130 is configured conically. In addition, other external geometries of the dosing tip 130 are possible, for example the external geometry of the dosing tip 130 can be circular-cylindrical.

Figure 4:
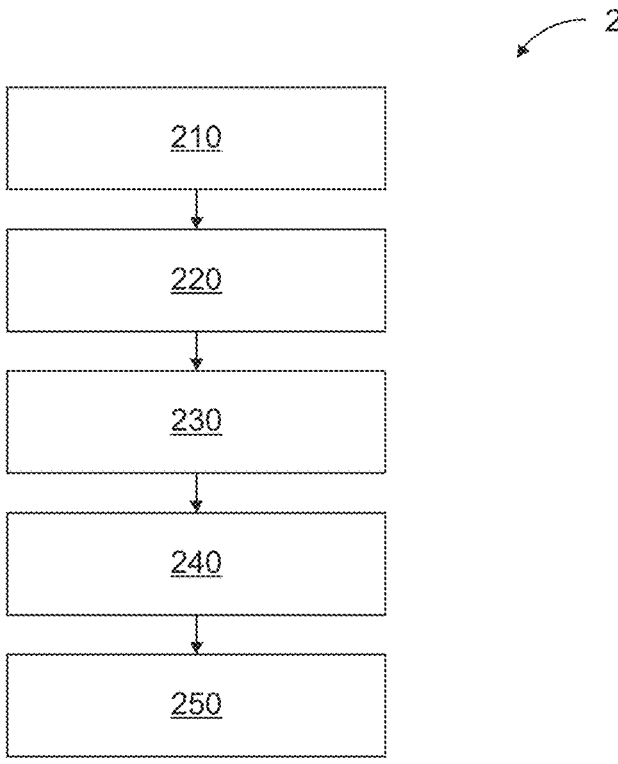

The processor 170 is configured to carry out the method 200 shown in FIG. 4. The method 200 is carried out using the dosing apparatus 100 described above. It is assumed here that the fluid channel has been vented in advance, so that the entire fluid channel is filled with the liquid.

The method 200 begins with a first step 210 in which the liquid reservoir 160 is pressurized with compressed air by means of the compressed air source 140 so that the liquid 161 is moved by pressurization in the first and second channel sections 121, 122.

A second step 220 follows, in which the valve member 112 is moved from the closed position to the open position at the beginning of a dosing time, so that the liquid 161 is moved into the third and fourth channel sections 123, 124 and flows out of the dosing tip 130.

This is followed by a third step 230, in which the valve member 112 is moved from the open position to the closed position at the end of the dosing time.

A fourth step 240 then follows, in which an outlet pressure course during the dosing time is determined with the outlet pressure sensor 152.

Finally, a fifth step 250 follows, in which a volume of the liquid 161 dosed from the dosing tip 130 during the dosing time is determined by means of the processor 170 with the outlet pressure course, a viscosity parameter and with a geometry parameter of the dosing tip 130.

Figure 5:
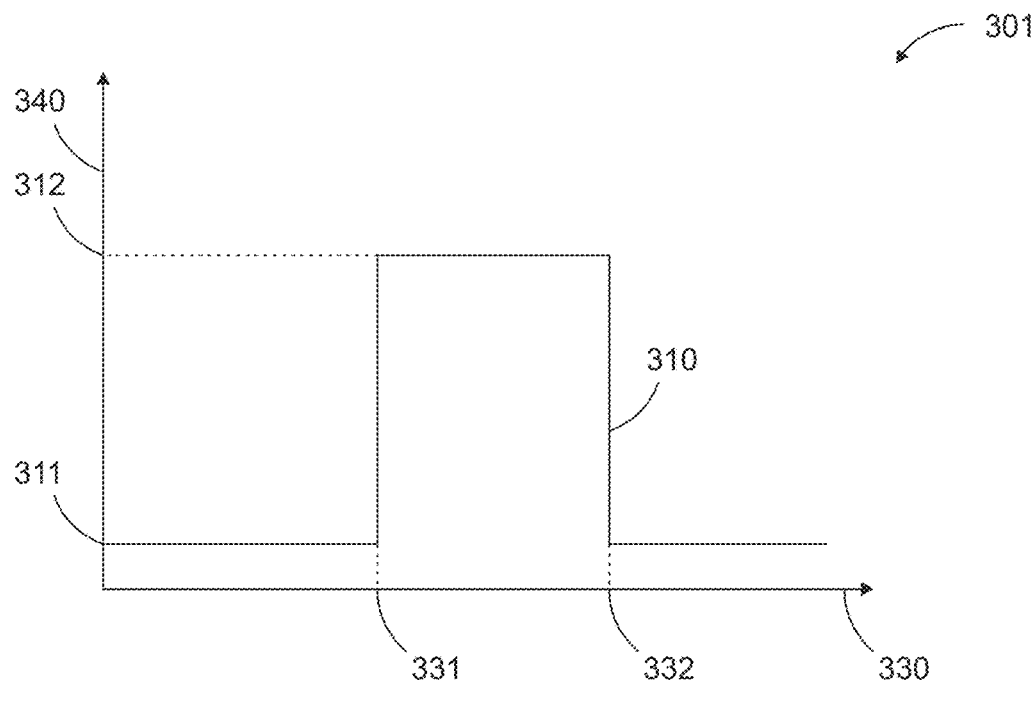
Figure 6:
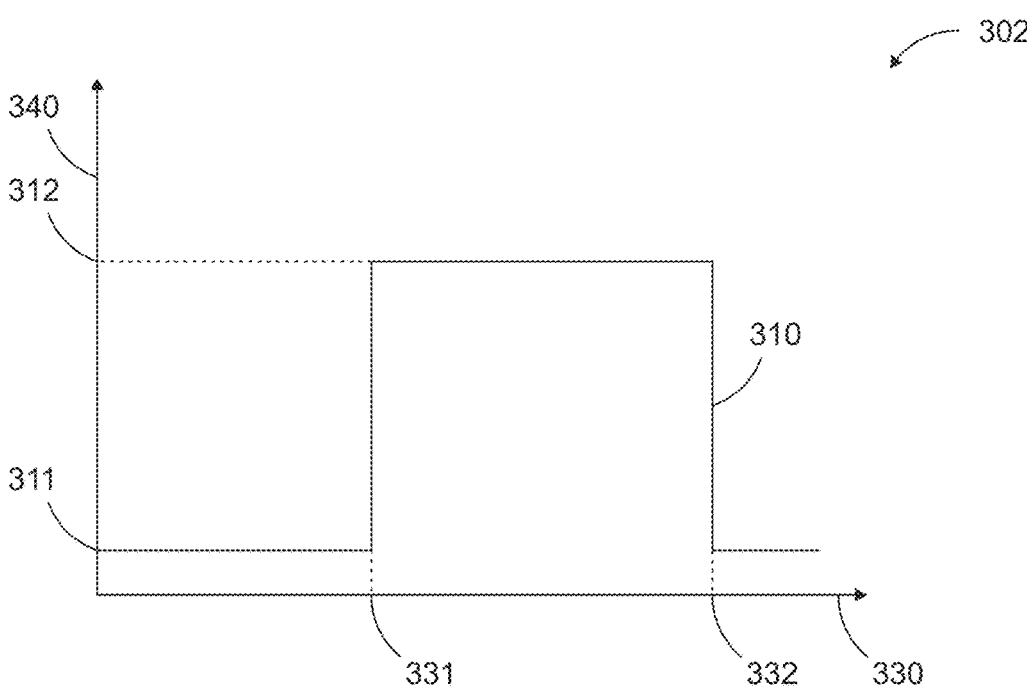

FIG. 5 shows an outlet pressure curve 310 with a short dosing time and FIG. 6 an outlet pressure curve 310 with a large dosing time. The outlet pressure curve 310 corresponds to a time curve of an outlet pressure plotted on a pressure axis 340 over a time axis 330. The outlet pressure is determined by the outlet pressure sensor 152 (see FIGS. 1 and 2).

At the beginning, the outlet pressure curve 310 runs along a first outlet pressure 311, which corresponds to the ambient pressure by way of example only. At the beginning of dispensing 331, the outlet pressure jumps from the first outlet pressure 311 to a second outlet pressure 312, which is configured by the fact that the fluidic connection between the second channel section 122 and the third channel section 123 has been released by the valve member 112 (see FIG. 1). After the end of dosing 332, the outlet pressure drops back to the first outlet pressure 311. At the end of dosing 332, the fluidic connection between the second channel section 122 and the third channel section 123 is separated again (see FIG. 2). The area below the outlet pressure curve 310 between the time at the beginning of dosing 331 and the time at the end of dosing 332 is proportional to the volume of the liquid 161 dosed from the dosing tip 130.

The short dosing time is expressed by the fact that the distance between the time at the start of dosing 331 and the time at the end of dosing 332 is smaller (see FIG. 5) than with a long dosing time (see FIG. 6). Accordingly, assuming an equal second outlet pressure 312, the volume of the liquid 161 dosed from the dosing tip 130 during the dosing operation whose outlet pressure curve 310 is shown in FIG. 5 is smaller than the volume of the liquid 161 dosed from the dosing tip 130 during the dosing operation whose outlet pressure curve 310 is shown in FIG. 6.

Figure 7:
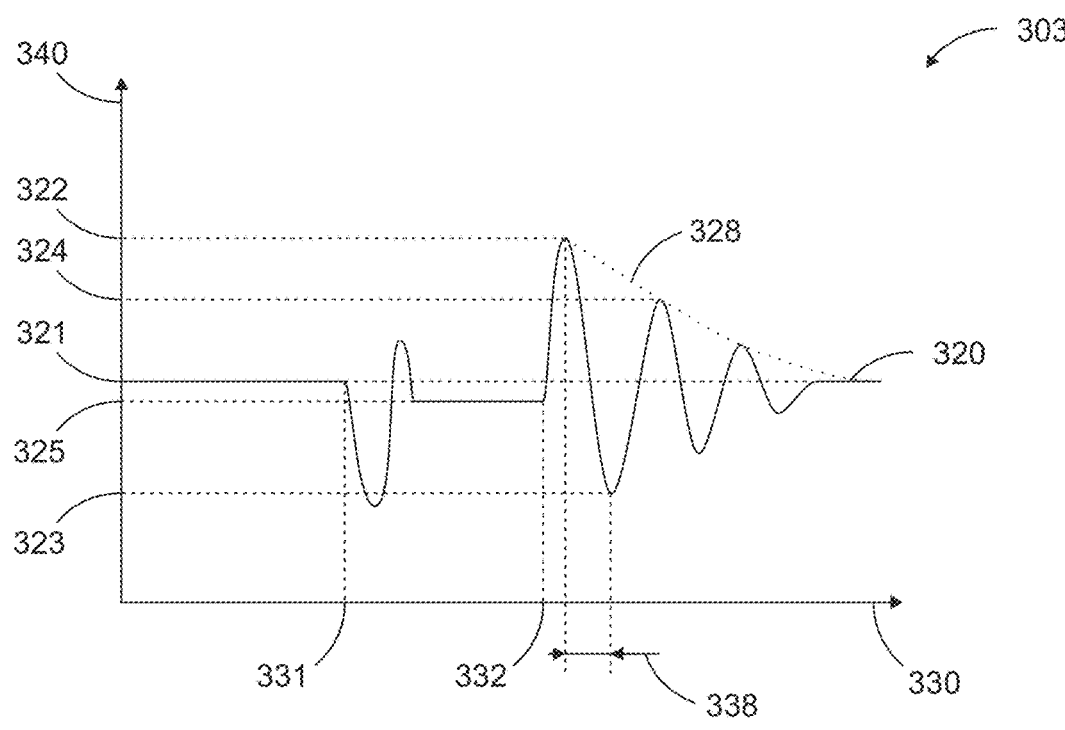
Figure 8:
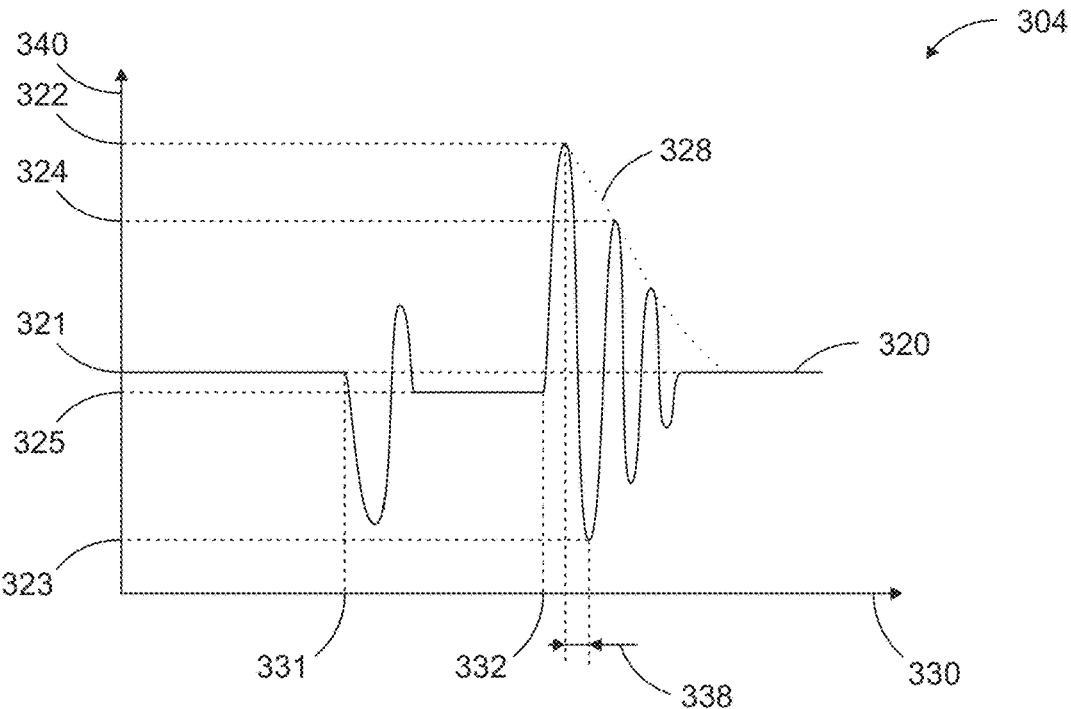

FIG. 7 shows an inlet pressure curve 320 of a lightly influenced inlet pressure and FIG. 8 shows an inlet pressure curve 320 of a strongly influenced inlet pressure. Assuming otherwise identical conditions, in particular an identical dosing apparatus 100 and an identical pressure provided by the compressed air source 140, the inlet pressure curve 320 shown in FIG. 7 corresponds to a liquid 161 which has a greater dynamic and/or kinematic viscosity than the liquid 161 with which the inlet pressure curve 320 shown in FIG. 8 is associated.

The inlet pressure curve 320 corresponds to a time course of an inlet pressure plotted on a pressure axis 340 over a time axis 330. The inlet pressure is determined using the inlet pressure sensor 151 (see FIGS. 1 and 2). At the beginning, the inlet pressure corresponds to a first inlet pressure 321. At the time at the beginning of dosing 331, a pressure oscillation results, which is expressed by the inlet pressure dropping abruptly and then leveling off at a fifth inlet pressure 325. The fifth inlet pressure 325 is slightly below the first inlet pressure 321. The difference between the first inlet pressure 321 and the fifth inlet pressure 325 is due to the fact that in the open position, i.e. between the time at the beginning of dosing 331 and the time at the end of dosing 332, a pressure loss occurs via the dosing tip 130.

After the end of dosing 332, a pressure oscillation results, which causes the inlet pressure to rise abruptly until a maximum is reached as an extremum with a second inlet pressure 322. The inlet pressure then drops until a minimum is reached as an extremum with a third inlet pressure 323. The inlet pressure then rises again until a maximum is reached as an extremum with a fourth inlet pressure 324. Finally, the inlet pressure stabilizes again at the first inlet pressure 321, wherein several further extrema are reached, each of which is a maximum or a minimum, which for the sake of clarity are not provided with reference signs in FIGS. 7 and 8.

FIGS. 7 and 8 additionally each show a time difference 338 between the time at which the inlet pressure reaches the second inlet pressure 322 and the time at which the inlet pressure reaches the third inlet pressure 323. This time difference 338 depends on the dynamic viscosity of the liquid 161. The time difference 338 shown in FIG. 7 is greater than the time difference 338 shown in FIG. 8.

The deviations of the amplitude of the inlet pressure between the pressure extrema 322, 323, 324 and the first inlet pressure 321 are smaller for the inlet pressure curve 320 shown in FIG. 7 than for the inlet pressure curve 320 shown in FIG. 8. In addition, a decay rate 328 of the amplitudes of successive pressure extrema 322, 324 is greater for the inlet pressure curve 320 shown in FIG. 8 than the decay rate 328 of the inlet pressure curve 320 shown in FIG. 7.

What is claimed is:

1. A method of dosing a liquid portion using a dosing apparatus, the dosing apparatus having a fluid channel comprising a first channel section, a second channel section, a third channel section and a fourth channel section, wherein the first channel section is fluidly connected to the second channel section, the second channel section is fluidly connected to the third channel section and the third channel section is fluidly connected to the fourth channel section, and with a valve in which the second channel section and the third channel section are arranged and which valve has a valve member which is arranged between the second channel section and the third channel section and which valve member can be moved into an open position in which the fluidic connection of the second channel section to the third channel section is enabled, and which valve member can be moved into a closed position, in which the fluidic connection of the second channel section to the third channel section is closed, the dosing apparatus having a liquid reservoir, in which a liquid is accommodated, which liquid reservoir is fluidically connected to the first channel section, the dosing apparatus having a dosing tip, which dosing tip is fluidically connected to the fourth channel section and acts as a throttle, the dosing apparatus having a compressed air source, by means of which compressed air source compressed air can be applied to the liquid reservoir, the dosing apparatus having an outlet pressure sensor, which outlet pressure sensor is associated with the fourth channel section, and/or the dosing apparatus having an inlet pressure sensor, which inlet pressure sensor is associated with the first channel section, the dosing apparatus having a processor, the method comprising the steps of:

pressurizing the liquid reservoir with compressed air by means of the compressed air source so that the liquid is moved by pressurization in the first channel section and the second channel section, moving the valve member from the closed position to the open position at the beginning of a dosing time, such that the liquid is moved into the third channel section and the fourth channel section and dosed from the dosing tip, moving the valve member from the open position to the closed position at the end of the dosing time, determining an outlet pressure course during the dosing time and/or after the dosing time with the outlet pressure sensor and/or determining an inlet pressure course during the dosing time and/or after the dosing time with the inlet pressure sensor, wherein the processor processes the outlet pressure course and/or the inlet pressure course together with a viscosity parameter of the liquid and together with a geometry parameter of the dosing tip in order to determine a volume of the liquid dosed from the dosing tip during the dosing time.

2. The method according to claim 1, wherein immediately after the valve member has been moved from the closed position to the open position or immediately after the valve member has been moved from the open position to the closed position, the outlet pressure sensor is used to determine an outlet pressure oscillation course, wherein the viscosity parameter is determined on the basis of the outlet pressure oscillation course.

3. The method according to claim 2, wherein the viscosity parameter is determined using at least one parameter, which parameter is determined using the outlet pressure oscillation course, which parameter is of the group: amplitude of a first extremum, amplitude of a second extremum, amplitude of a third extremum, time difference between a first extremum and/or the second extremum and/or the third extremum, decay rate of the amplitude of at least two successive extrema.

4. The method according to claim 3, wherein before the volume of the liquid is determined, the processor is parameterized by using the inlet pressure sensor to determine a maximum feed pressure provided by the compressed air source while the valve member is in the closed position, the following steps also being carried out for at least one test liquid with known dynamic viscosity: moving the test liquid in the fluid channel by moving the valve member from the closed position to the open position and subsequently moving the valve member from the open position to the closed position, wherein immediately after the valve member has been moved from the closed position to the open position or immediately after the valve member has been moved from the open position to the closed position, the outlet pressure sensor is used to determine an outlet pressure oscillation course of the at least one test liquid, wherein the viscosity parameter of the at least one test liquid is determined on the basis of the outlet pressure oscillation course of the at least one test liquid, wherein the viscosity parameter of the at least one test liquid is determined using at least one parameter, which parameter is determined using the outlet pressure oscillation course of the at least one test liquid, which parameter is of the group: amplitude of a first extremum, amplitude of a second extremum, amplitude of a third extremum, time difference between a first extremum and/or the second extremum and/or the third extremum, decay rate of the amplitude of at least two successive extrema, wherein subsequently at least one viscosity class is determined taking into account the determined viscosity parameter of the at least one test liquid and the supply pressure, wherein, in the subsequent determination of the volume, the at least one viscosity class is associated with the liquid if there is a corresponding match, this associated at least one viscosity class being used to determine the volume of the liquid dosed from the dosing tip during the dosing time.

5. The method according to claim 4, wherein the processor is parameterized with a plurality of test liquids each having known, different dynamic viscosities, a plurality of viscosity classes being determined taking into account the viscosity parameter determined for each of the plurality of test liquids.

6. The method according to claim 5, wherein the different viscosity classes are determined using a viscosity parameter-based machine learning model.

7. The method according to claim 4, wherein a test volume is determined for at least one test liquid, wherein a comparison volume is determined for the at least one test liquid, wherein a volume-based model for machine learning is trained taking into account the test volume and the comparison volume.

8. The method according to claim 7, wherein a test volume and a comparison volume each are determined for a plurality of test liquids, the volume-based model for machine learning being trained taking into account the test volumes and the comparison volumes.

9. The method according to claim 3, wherein before the volume of the liquid is determined, the processor is parameterized by using the inlet pressure sensor to determine a maximum feed pressure provided by the compressed air source while the valve member is in the closed position, the following steps also being carried out for at least one test liquid with known dynamic viscosity: moving the test liquid in the fluid channel by moving the valve member from the open closed to the open position and subsequently moving the valve member from the open position to the closed position, wherein immediately after the valve member has been moved from the closed position to the open position or immediately after the valve member has been moved from the open position to the closed position, the inlet pressure sensor is used to determine an inlet pressure oscillation course of the at least one test liquid, wherein the viscosity parameter of the at least one test liquid is determined on the basis of the inlet pressure oscillation course of the at least one test liquid, wherein the viscosity parameter is determined using at least one parameter, which parameter is determined using the inlet pressure oscillation course of the at least one test liquid, which parameter is of the group: amplitude of a first extremum, amplitude of a second extremum, amplitude of a third extremum, time difference between a first extremum and/or the second extremum and/or the third extremum, decay rate of the amplitude of at least two successive extrema, wherein subsequently at least one viscosity class is determined taking into account the determined viscosity parameter of the at least one test liquid and the supply pressure, wherein, in the subsequent determination of the volume, the at least one viscosity class is associated with the liquid if there is a corresponding match, this associated at least one viscosity class being used to determine the volume of the liquid dosed from the dosing tip during the dosing time.

10. The method according to claim 2, wherein the viscosity parameter and the volume of the liquid dosed from the dosing tip are used to determine a mass of the liquid dosed from the dosing tip.

11. The method according to claim 1, wherein immediately after the valve member has been moved from the closed position to the open position or immediately after the valve member has been moved from the open position to the closed position, the inlet pressure sensor is used to determine an inlet pressure oscillation course, wherein the viscosity parameter is determined on the basis of the inlet pressure oscillation course.

12. The method according to claim 11, wherein the viscosity parameter is determined using at least one parameter, which parameter is determined using the inlet pressure oscillation course, which parameter is of the group: amplitude of a first extremum, amplitude of a second extremum, amplitude of a third extremum, time difference between a first extremum and/or the second extremum and/or the third extremum, decay rate of the amplitude of at least two successive extrema.

13. A dosing apparatus having a fluid channel comprising:
   a first channel section, a second channel section, a third channel section and a fourth channel section,
   wherein the first channel section is fluidly connected to the second channel section, the second channel section is fluidly connected to the third channel section and the third channel section is fluidly connected to the fourth channel section, and with a valve in which the second channel section and the third channel section are arranged and which valve has a valve member which is arranged between the second channel section and the third channel section and which valve member can be moved into an open position in which the fluidic connection of the second channel section to the third channel section is enabled, and which valve member can be moved into a closed position, in which the fluidic connection of the second channel section to the third channel section is closed, the dosing apparatus having a liquid reservoir, in which a liquid is accommodated, which liquid reservoir is fluidically connected to the first channel section, the dosing apparatus having a dosing tip, which dosing tip is fluidically connected to the fourth channel section and acts as a throttle, the dosing apparatus having a compressed air source, by means of which compressed air source compressed air can be applied to the liquid reservoir, the dosing apparatus having an outlet pressure sensor, which outlet pressure sensor is associated with the fourth channel section, and/or the dosing apparatus having an inlet pressure sensor, which inlet pressure sensor is associated with the first channel section, the dosing apparatus having a processor, which processer being configured to carry out a method comprising the steps of:

pressurizing the liquid reservoir with compressed air by means of the compressed air source so that the liquid is moved by pressurization in the first channel section and the second channel section, moving the valve member from the closed position to the open position at the beginning of a dosing time, such that the liquid is moved into the third channel section and the fourth channel section and dosed from the dosing tip, moving the valve member from the open position to the closed position at the end of the dosing time, determining an outlet pressure course during the dosing time and/or after the dosing time with the outlet pressure sensor and/or determining an inlet pressure course during the dosing time and/or after the dosing time with the inlet pressure sensor, wherein the processor processes the outlet pressure course and/or the inlet pressure course together with a viscosity parameter of the liquid and together with a geometry parameter of the dosing tip in order to determine a volume of the liquid dosed from the dosing tip during the dosing time.

* * * * *